United States Patent
Peterson et al.

(10) Patent No.: US 11,709,277 B2
(45) Date of Patent: Jul. 25, 2023

(54) SOFTWARE-BASED TIME ROLLOVER DETECTION

(71) Applicant: Caterpillar Inc., Peoria, IL (US)

(72) Inventors: Michael L. Peterson, Washington, IL (US); Andrew Thomas Elliott, Metamora, IL (US); William Edwin Peterson, East Peoria, IL (US); David Louis Rottier, Washington, IL (US); Michael Aaron Caruthers, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 780 days.

(21) Appl. No.: 16/827,318

(22) Filed: Mar. 23, 2020

(65) Prior Publication Data

US 2021/0293974 A1 Sep. 23, 2021

(51) Int. Cl.
| | |
|---|---|
| *G01S 19/33* | (2010.01) |
| *G01S 19/14* | (2010.01) |
| *G01S 19/39* | (2010.01) |
| *G07C 5/00* | (2006.01) |
| *G07C 9/00* | (2020.01) |

(52) U.S. Cl.
CPC .............. *G01S 19/33* (2013.01); *G01S 19/14* (2013.01); *G07C 5/008* (2013.01); *G07C 9/00182* (2013.01)

(58) Field of Classification Search
CPC .......... G01S 19/33; G01S 19/14; G01S 19/39; G07C 5/008
USPC .................................................... 342/357.22
See application file for complete search history.

(56) References Cited

U.S. PATENT DOCUMENTS

| | | | |
|---|---|---|---|
| 5,923,618 A | 7/1999 | Nelson, Jr. | |
| 7,355,551 B2 | 4/2008 | Xie et al. | |
| 8,792,308 B2 | 7/2014 | Kato et al. | |
| 9,516,395 B2 | 12/2016 | Foster, III | |
| 9,979,991 B2 | 5/2018 | Scott | |
| 10,330,793 B2 | 6/2019 | Lin | |

FOREIGN PATENT DOCUMENTS

| | | | | |
|---|---|---|---|---|
| CN | 201654495 | | 11/2010 | |
| CN | 106918823 B | * | 6/2019 | ............. G01S 19/14 |
| JP | 2007315953 A | * | 12/2007 | ............. G01C 21/28 |
| JP | 2010216999 A | | 9/2010 | |
| JP | 2010249594 | | 11/2010 | |
| JP | 5519473 B2 | | 6/2014 | |

(Continued)

OTHER PUBLICATIONS

US D978,863 S, 02/2023, Zang (withdrawn)*

*Primary Examiner* — Harry K Liu
(74) *Attorney, Agent, or Firm* — Harrity & Harrity LLP

(57) ABSTRACT

A method for detecting time rollovers is disclosed. The method may include receiving time data including week data and second data and processing the time data to generate a first date. The method may include generating, based on the first date and an offset value, a second date and obtaining, when the second date is prior to a baseline date, a network date. The method may include assigning the network date as the baseline date and processing the network date and the first date to determine an updated offset value. The method may include storing the updated offset value as the offset value and determining, based on the network date, a system date.

20 Claims, 10 Drawing Sheets

(56) References Cited

FOREIGN PATENT DOCUMENTS

| | | | |
|---|---|---|---|
| JP | 2017049088 | | 3/2017 |
| JP | 6421728 | B2 | 11/2018 |
| JP | 2019148520 | | 9/2019 |
| JP | 2020098133 | A * | 6/2020 |
| JP | 6825775 | B2 * | 2/2021 |

* cited by examiner

SOFTWARE-BASED TIME ROLLOVER DETECTION

TECHNICAL FIELD

The present disclosure relates generally to controllers for machines and, for example, to a controller configured to detect time rollovers.

BACKGROUND

A machine may include a controller to provide instructions and/or information to components of the machine, such as an engine, a security system, a productivity-tracking system, a maintenance alert system, and/or the like. For example, a machine may include a controller having a Global Navigation Satellite System (GNSS) receiver (e.g., a Global Positioning System (GPS) receiver, a Galileo receiver, a Global Navigation Satellite System, Russia (GLONASS) receiver, a BeiDou receiver, and/or the like), a satellite radio, a cellular radio, and/or the like, and the controller may provide time and/or date information to a security system. The security system may use the time and/or date information to determine whether to permit an operator to enter the machine, start an engine in the machine, and/or the like. The security system may, for example, be configured to only permit the operator and/or a particular operator from among a group of operators to enter the machine based on time of day, day of the week, and/or the like.

The controller may include a GPS receiver that obtains weeks and seconds information from a GPS satellite, and the controller may determine a time and/or date based on the weeks and seconds information. The GPS satellite may provide the weeks information as a number of weeks from a given date starting at zero. However, based on GPS protocols, the GPS satellite may only use ten binary digits to provide the weeks information. Thus, after 1,024 weeks, the GPS satellite provides zero for the weeks information, which may be referred to as a "rollover." Such a rollover may occur in any system that tracks time information by incrementally increasing a counter, where the counter has a limited data space (e.g., a set number of binary digits and/or the like) for transmission, storage, and/or the like.

After a rollover occurs, the controller may provide incorrect time and/or date information to components of the machine, such as the engine, the security system, the productivity-tracking system, the maintenance alert system, and/or the like. For example, the controller may provide incorrect time and/or date information to the security system, and the security system may prevent, based on the incorrect time and/or date information, the operator from accessing the machine, starting the engine, and/or the like.

One attempt to detect time rollovers is disclosed in Japanese Patent Publication No. JP6421728 to Denso, which published on Nov. 14, 2018 (the '728 publication). In particular, the '728 publication discloses an on-vehicle device that sets, as an initial date and time, the date and time of a previous GPS reception date and time backed up during a previous operation and setup date and time, and determines whether a rollover has occurred on the basis of the initial date and time and a GPS navigation message. If a rollover has occurred, the on-vehicle device generates a GPS reception date and time on the basis of the navigation message by taking a period corresponding to the rollover into consideration.

While the on-vehicle device of the '728 publication may detect that a rollover has occurred and update a date and time based on the rollover, the on-vehicle device also may detect that a rollover has occurred when a rollover has not occurred. For example, a formatting error, a transmission error, and/or the like in the GPS navigation message may cause the on-vehicle device to detect that a rollover has occurred, and the on-vehicle device may generate an updated date and time, and update the backed up previous GPS reception date and time, thereby causing the on-vehicle device to repeatedly detect that a rollover has occurred when GPS navigation messages are received.

The method of the present disclosure solves one or more of the problems set forth above and/or other problems in the art.

SUMMARY

According to some implementations, a method may include receiving, by a controller for a machine, time data including week data and second data; processing, by the controller, the time data to generate a first date; generating, by the controller and based on the first date and an offset value, a second date; obtaining, by the controller and when the second date is prior to a baseline date, a network date; assigning, by the controller, the network date as the baseline date; processing, by the controller, the network date and the first date to determine an updated offset value; storing, by the controller, the updated offset value as the offset value; providing, by the controller, when the second date is prior to the baseline date, and to an application, a system date based on the network date, wherein the application determines, based on the system date, whether to cause a door of the machine to be locked; and providing, by the controller, when the second date is not prior to the baseline date, and to the application, the system date, wherein the system date corresponds to the second date.

According to some implementations, a method may include receiving, by a device, time data including week data and second data; processing, by the device, the time data to generate a first date; generating, by the device and based on the first date and an offset value, a second date; obtaining, by the device and when the second date is prior to a baseline date, a network date; assigning, by the device, the network date as the baseline date; processing, by the device, the network date and the first date to determine an updated offset value; storing, by the device, the updated offset value as the offset value; and determining, by the device and based on the network date, a system date.

According to some implementations, a method may include receiving, by a device and from a Global Navigation Satellite System (GNSS) satellite, time data including week data and second data; processing, by the device, the time data to generate a first date; generating, by the device and based on the first date and an offset value, a second date; obtaining, by the device and when the second date is prior to a baseline date, a network date from at least one of a network time protocol or a satellite system; assigning, by the device, the network date as the baseline date; processing, by the device, the network date and the first date to determine an updated offset value; storing, by the device, the updated offset value as the offset value; and determining, by the device and based on the network date, a system date.

DETAILED DESCRIPTION

Figure 1:
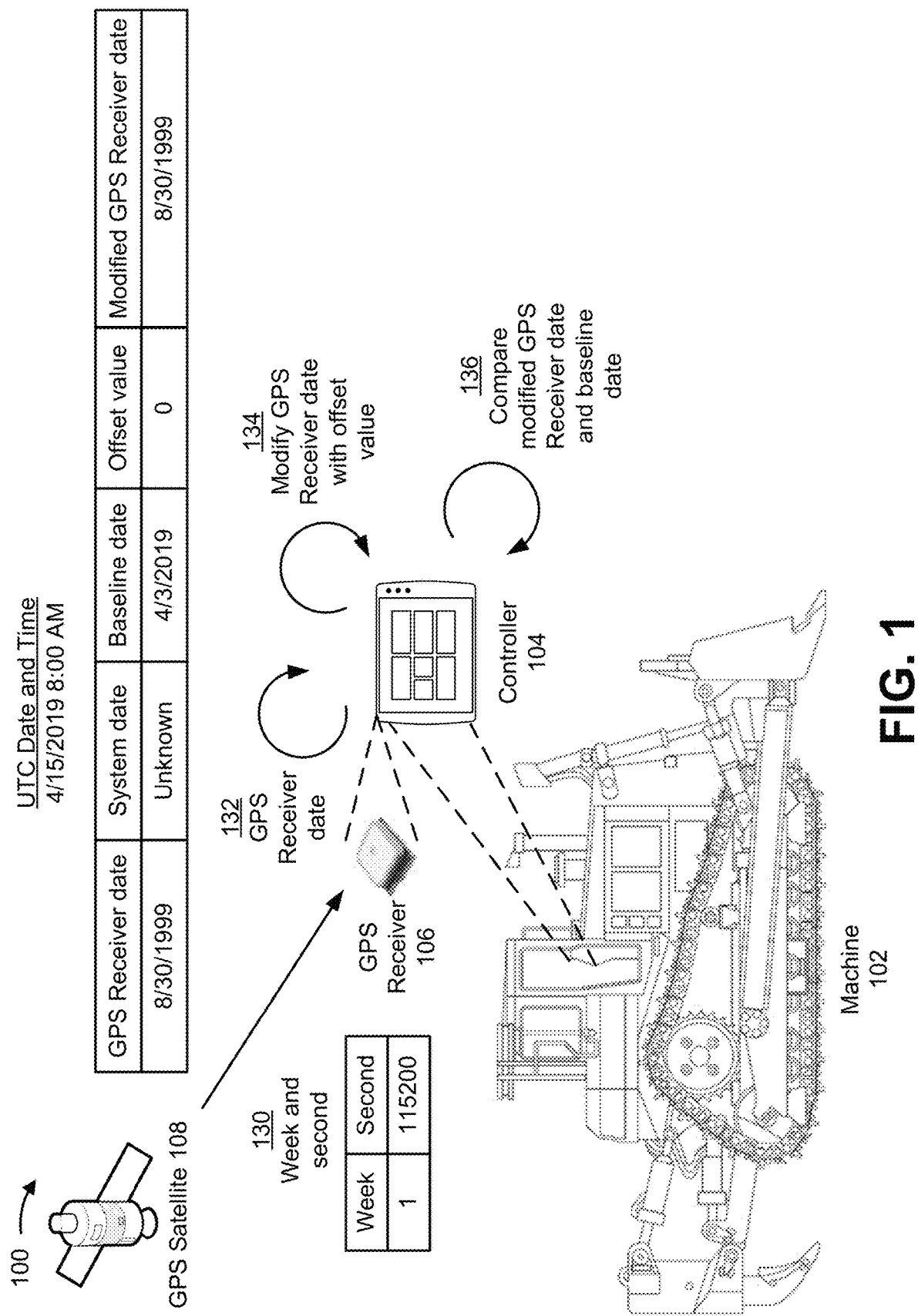
FIG. 1 is a diagram of an example implementation of time rollover detection described herein.

This disclosure relates to a process for detecting a time rollover, for example, using a controller. The process and/or the controller have universal applicability to any machine utilizing time data (e.g., from a GNSS receiver and/or the like). For example, the controller may detect when a time rollover occurs by comparing a GPS receiver date to a baseline date (e.g., stored by the controller when the controller was last on) and determining that a time rollover has occurred when the GPS receiver date is prior to the baseline date. The controller may, based on determining that a time rollover has occurred, obtain a network date from an asset connectivity satellite and/or a network (e.g., to confirm that the time rollover occurred). The controller may determine whether the GPS receiver date and/or the network date are valid (e.g., have proper formatting and/or the like) to prevent invalid dates from triggering the detection of a time rollover. The controller may update, based on the network date, the baseline date, and the controller may update, based on the network date, an offset value. The controller may use the offset value to modify GPS receiver dates to account for the detected time rollover. The following description of the figures and example implementations provide further illustration and description of the method and/or controller.

FIGS. 1-6 are diagrams of an example implementation 100 of time rollover detection described herein. For example, as shown in FIGS. 1-6, example implementation 100 includes a machine 102, a controller 104, a GPS receiver 106, a GPS satellite 108, an asset connectivity satellite 110, and a network 112. Although the example implementation 100 includes the GPS receiver 106 and the GPS satellite 108, other implementations may include other types of GNSS receivers and GNSS satellites (e.g., Galileo, GLONASS, BeiDou, and/or the like). FIGS. 1-6 show dates using U.S. formatting of MM/DD/YYYY.

As shown in FIG. 1, the machine 102 may include the controller 104. For example, the controller 104 may be an embedded controller for providing instructions and/or information to components of the machine, such as an engine, a security system, a productivity-tracking system, a maintenance alert system, and/or the like. The controller 104 may include and/or be communicatively connected to the GPS receiver 106. As shown in FIG. 1, the controller 104 may store a table (e.g., in nonvolatile memory and/or the like) including a GPS receiver date, a system date, a baseline date, an offset value, and a modified GPS receiver date, each of which will be described further herein.

As shown in FIG. 1, the GPS satellite 108 may provide, to the GPS receiver 106, time data indicated by reference number 130, comprising week data and second data. For example, an operator may turn on the machine 102, the controller 104, and/or the like and the GPS receiver 106 may begin receiving, from the GPS satellite 108, signals including the week data and the second data. As shown in FIG. 1, the week data may have a value of 1, and the second data may have a value of 115200. As also shown in FIG. 1, when the operator turns on the machine 102, the controller 104, and/or the like, the system date is unknown.

As shown in FIG. 1, and by reference number 132, the controller 104 may generate a GPS receiver date (e.g., by processing the time data). For example, the GPS receiver 106 may generate, based on the week data and the second data, a message for the controller including the GPS receiver date. The GPS receiver date may be generated by adding a number of weeks in the week data and a number of seconds in the second data to a beginning date and time. For example, GPS uses Jan. 6, 1980 (01/06/1980) at 12:00 am as a beginning date and time.

The GPS receiver 106 may be configured to generate the GPS receiver date based on the week data, the second data, and an offset to account for any rollovers that may have occurred before manufacturing of the GPS receiver 106 (e.g., a first GPS rollover occurring on Aug. 22, 1999 at 12:00 am, a second GPS rollover occurring on Apr. 7, 2019 at 12:00 am, and/or the like). For example, the GPS receiver 106 may be configured to generate the GPS receiver date by adding, to Jan. 6, 1980 at 12:00 am, the number of weeks in the week data, the number of seconds in the second data, and an offset of 1,024 weeks to account for the first GPS rollover, to obtain the GPS receiver date of Aug. 30, 1999 at 8:00 am.

Using the example of FIG. 1, the GPS receiver 106 may add an offset of 1,024 weeks to Jan. 6, 1980 at 12:00 am to account for the first GPS rollover and to obtain Aug. 22, 1999 at 12:00 am. The GPS receiver 106 may add 1 week to Aug. 22, 1999 at 12:00 am to account for the 1 week in the week data and to obtain Aug. 29, 1999 at 12:00 am. The GPS receiver may add 115,200 seconds to Aug. 29, 1999 at 12:00 am to account for the seconds in the second data and to obtain the GPS receiver date of Aug. 30, 1999.

As shown in FIG. 1, and by reference number 134, the controller 104 may modify the GPS receiver date with an offset value. As shown in FIG. 1, the offset value may initially be zero. The offset value may include a value to account for any rollovers that may have occurred since the manufacture of the GPS receiver 106. For example, if the GPS receiver 106 is manufactured before a rollover and the controller 104 is manufactured after the rollover, the controller 104 may be configured to initially store a value to account for the rollover that occurred between the manufacturing of the GPS receiver 106 and the controller 104. Thus, when the controller 104 modifies the GPS receiver date with the offset value, the modified GPS receiver date may be corrected to account for the rollover. Based on the GPS receiver date of Aug. 30, 1999 and the offset value of zero shown in FIG. 1, the controller 104 may generate a modified GPS receiver date of Aug. 30, 1999.

As shown in FIG. 1, and by reference number 136, the controller 104 may compare the modified GPS receiver date and a baseline date. The baseline date may initially be a date of manufacture of the controller 104, a date after a rollover and before the date of manufacture of the controller 104, a date on which the controller 104 and/or the machine 102 were last turned on, and/or the like. As shown in FIG. 1, the baseline date may be Apr. 3, 2019, which may correspond to the date on which the controller 104 was last turned on.

The controller 104 may process the modified GPS receiver date and the baseline date to determine whether the modified GPS receiver date is prior to the baseline date. For example, the controller 104 may process the modified GPS receiver date of Aug. 30, 1999 and the baseline date of Apr. 3, 2019 to determine that the modified GPS receiver date is prior to the baseline date.

Based on determining that the modified GPS receiver date is prior to the baseline date, the controller 104 may determine that a rollover has occurred. For example, the baseline date of Apr. 3, 2019 may correspond to the date on which the controller 104 was last turned on. The second GPS rollover occurred on Apr. 7, 2019 at 12:00 am. As shown in FIG. 1, the operator may turn on the controller 104 on Apr. 15, 2019 at 8:00 am (UTC). Based on determining that the modified GPS receiver date of Aug. 30, 1999 is prior to the baseline date of Apr. 3, 2019, the controller 104 may determine that the second rollover has occurred.

Figure 2:
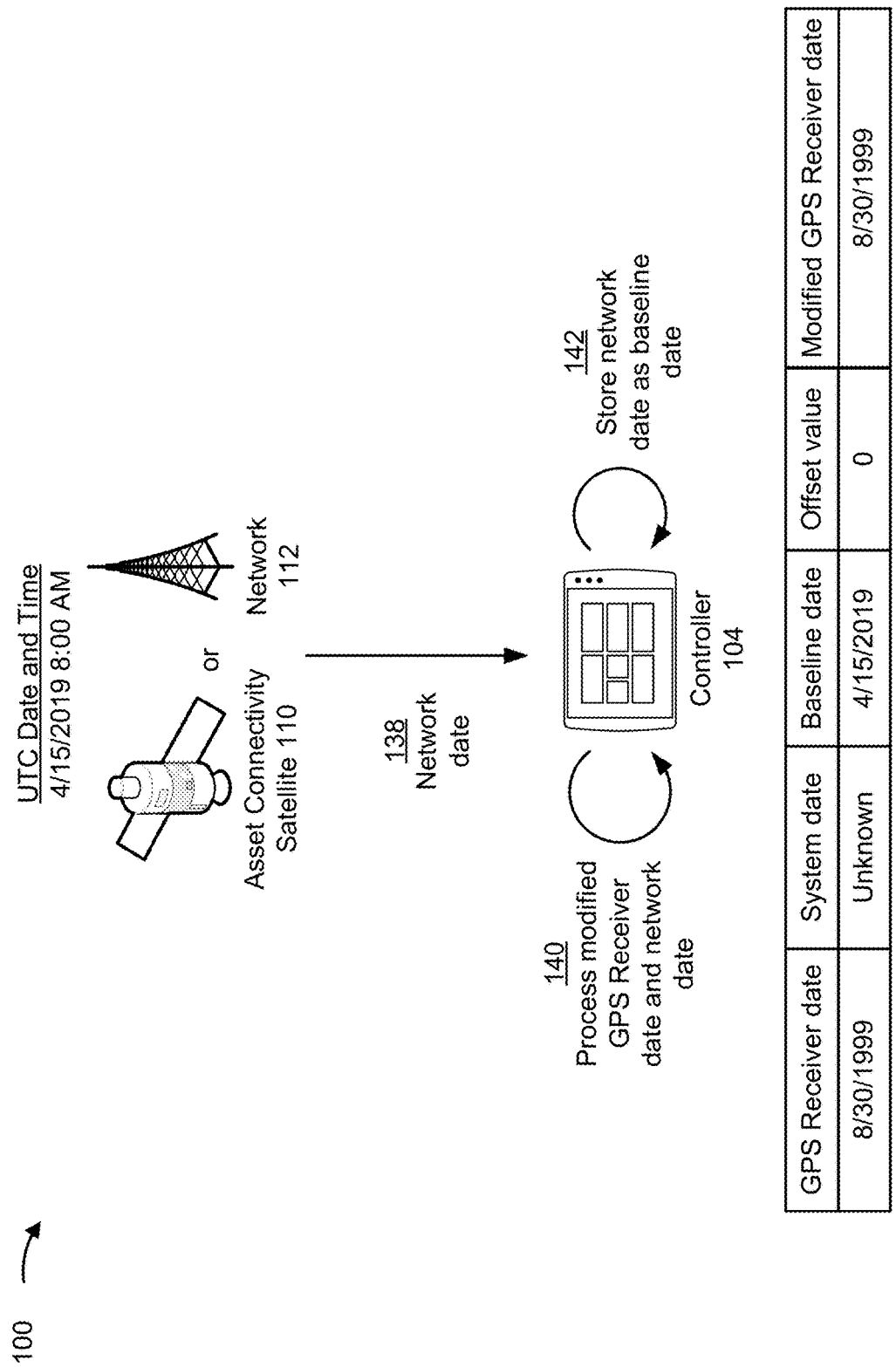
FIG. 2 is a diagram of an example implementation of time rollover detection described herein.

As shown in FIG. 2, and by reference number 138, the controller 104 may obtain, from the asset connectivity satellite 110 and/or the network 112, a network date. For example, the controller 104 may obtain, based on determining that the modified GPS receiver date is prior to the baseline date, the network date. The asset connectivity satellite 110 may be a component of an asset tracking system used by an entity (e.g., an owner, an operator, a manufacturer, and/or the like) associated with the machine 102 and/or the controller 104 to track, monitor, control, and/or the like the machine 102 and/or the controller 104.

The network 112 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks. For example, the network 112 may include a wireless network for a jobsite in which the machine 102 is operating, where the wireless network is maintained by an entity associated with the machine 102, and the network 112 may include a network time protocol from which the controller 104 obtains the network date.

As shown in FIG. 2, and by reference number 140, the controller 104 may process the modified GPS receiver date and the network date. The controller 104 may process the modified GPS receiver date and the network date to determine whether the modified GPS receiver date and the network date are valid. For example, the controller 104 may determine whether the modified GPS receiver date and the network date have a correct formatting schema (e.g., month-day-year formatting and/or the like), contain valid date data (e.g., do not contain only zeros and/or the like), and/or the like. By determining whether the modified GPS receiver date and the network date are valid before determining the system date, updating the baseline date, updating the offset value, and/or the like, the controller 104 may prevent invalid GPS receiver dates and/or network dates from impacting the system date, the baseline date, the offset value, and/or the like. In this way, the controller 104 may provide correct time and/or date information to other components, systems, applications, and/or the like.

As shown in FIG. 2, and by reference number 142, the controller 104 may store the network date as the baseline date. For example, the controller 104 may store, based on determining that the modified GPS receiver date and the network date are valid, the network date as the baseline date. As shown in FIG. 2, the network date may be Apr. 15, 2019, and the controller 104 may store the network date of Apr. 15, 2019 as the baseline date in the table.

The controller 104 may determine and store the baseline date based on the network date and a time zone offset, where the time zone offset accounts for a time zone difference between the network date and UTC time in which the GPS satellite provides time data. For example, the controller 104 may convert, using the time zone offset, the network date to UTC time and store the converted UTC network date as the baseline date.

Figure 3:
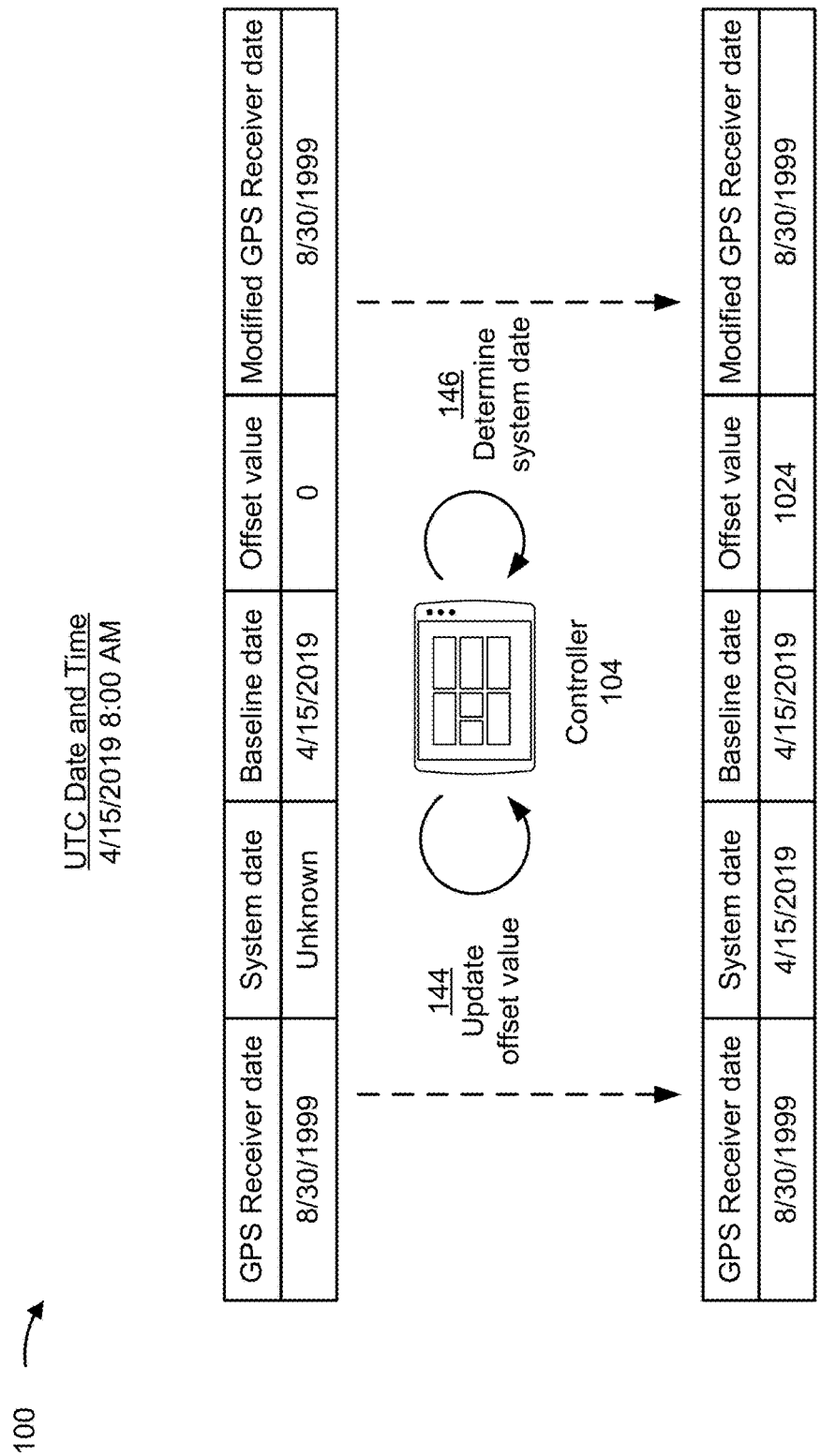
FIG. 3 is a diagram of an example implementation of time rollover detection described herein.

As shown in FIG. 3, and by reference number 144, the controller 104 may update the offset value. For example, the controller 104 may update, based on determining that the modified GPS receiver date and the network date are valid, the offset value. The controller 104 may increase the offset value by a number equivalent to a time between rollovers. For example, and as shown in FIG. 3, the controller 104 may update the offset value by adding 1,024 to the offset value, where 1,024 corresponds to the number of weeks between GPS rollovers.

The controller 104 may determine an epoch count. For example, a first epoch may be a time period between the beginning date and time of Jan. 6, 1980 at 12:00 am and the first GPS rollover of Aug. 22, 1999 at 12:00 am, and a second epoch may be a time period between the first GPS rollover of Aug. 22, 1999 at 12:00 am and the second GPS rollover occurring on Apr. 7, 2019 at 12:00 am. The epoch count may correspond to a number of epochs between the beginning date and time and a system date and time. For example, based on a system date of Apr. 15, 2019 at 8:00 am, the controller 104 may determine an epoch count of 2. Additionally, or alternatively, the controller 104 may determine the epoch count by determining a difference between the system date and the beginning date, dividing the difference by 1,024 to obtain a quotient, and determining that the epoch count corresponds to the quotient.

As shown in FIG. 3, and by reference number 146, the controller 104 may determine the system date. For example, the controller 104 may determine, based on determining that the modified GPS receiver date and the network date are valid, the system date. As shown in FIG. 3, the controller 104 may determine that the system date corresponds to the network date of Apr. 15, 2019.

The controller 104 may provide the system date to other components of the machine, such as the engine, the security system, the productivity-tracking system, the maintenance alert system, and/or the like. For example, the controller 104 may provide the system date to the security system, and the security system may permit, based on the system date, the operator to perform one or more functions such as starting the engine, turning on other components of the machine, and/or the like.

In another example, the controller 104 may provide the system date to the productivity-tracking system. The productivity-tracking system may provide, based on the system date, information to an employee management system. For example, the productivity-tracking system may transmit information (e.g., via the network 112, another network, and/or the like) regarding operation of the machine 102 by the operator that includes the system date.

In yet another example, the controller 104 may provide the system date to the maintenance alert system. The maintenance alert system may provide, based on the system date, information, alerts, and/or the like to the operator, a maintenance management system, and/or the like. For example, the maintenance alert system may determine, based on the system date, that one or more parts of the machine need to be replaced, and may provide an alert to the operator and transmit information (e.g., via the network 112, another network, and/or the like) regarding the one or more parts of the machine that need to be replaced.

In this way, the controller 104 may determine, based on the baseline date and the modified GPS receiver date, whether a rollover has occurred, obtain the network date to confirm that the rollover has occurred, update the baseline date, update the offset value, and provide correct system dates to components of the machine 102 despite the rollover.

Figure 4:
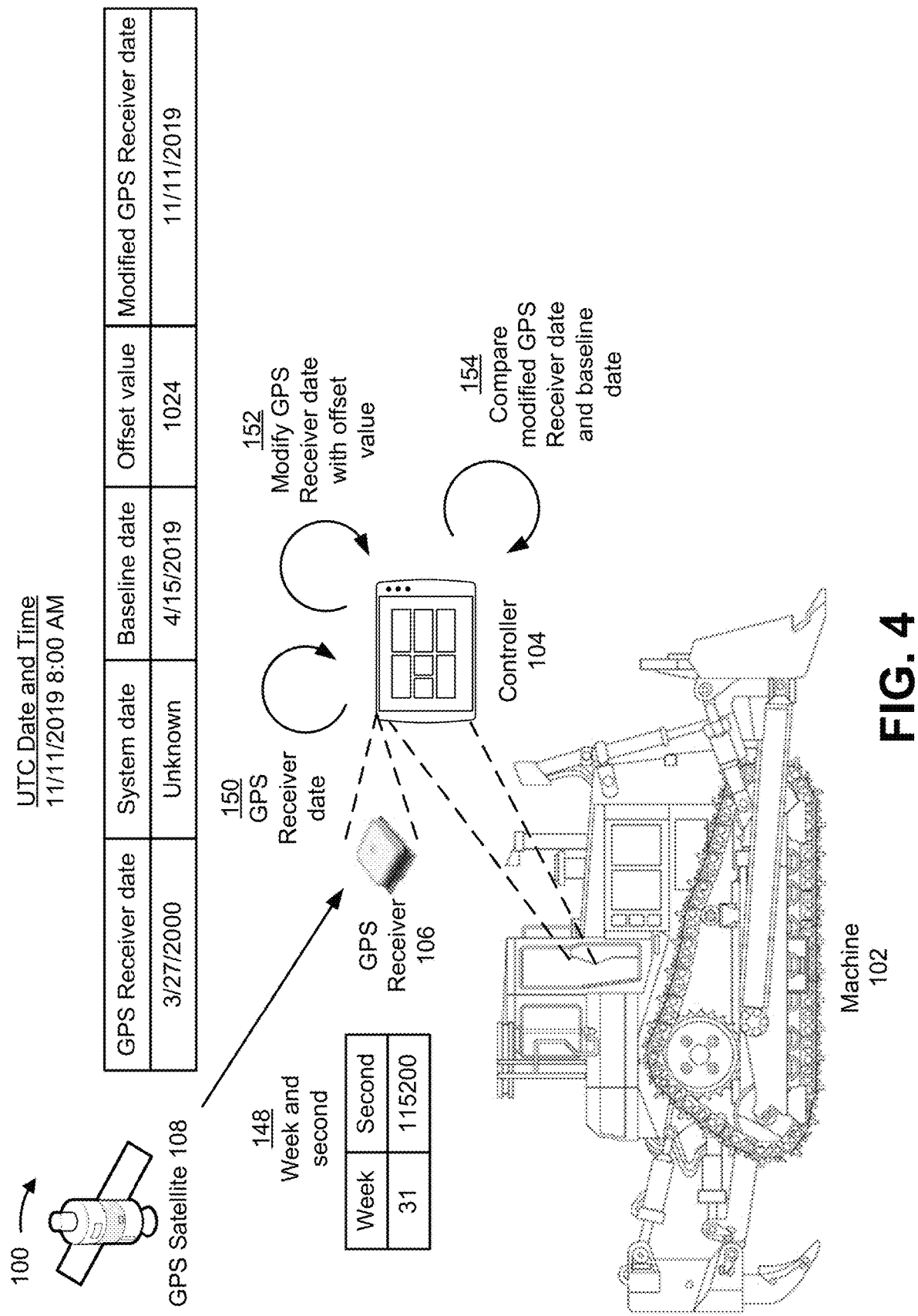
FIG. 4 is a diagram of an example implementation of time rollover detection described herein.

The operator may turn on the machine 102, the controller 104, and/or the like at a later date and time, such as Nov. 11, 2019 at 8:00 am, as shown in FIG. 4. As shown by reference number 148, the GPS satellite 108 may provide, to the GPS receiver 106, time data including week data and second data. For example, the GPS receiver 106 may begin receiving, from the GPS satellite 108, signals including the week data and the second data when the operator turns on the machine 102, the controller 104, and/or the like. As shown in FIG. 4, the week data may have a value of 31, and the second data may have a value of 115200. As also shown in FIG. 4, when the operator turns on the machine 102, the controller 104, and/or the like, the system date is unknown.

As shown in FIG. 4, and by reference number 150, the controller 104 may generate a GPS receiver date (e.g., by processing the time data) in a manner similar to that described with respect to FIG. 1. For example, the GPS receiver 106 may be configured to generate the GPS receiver date by adding, to Jan. 6, 1980 at 12:00 am, the number of weeks in the week data, the number of seconds in the second data, and an offset of 1,024 weeks to account for the first GPS rollover to obtain the GPS receiver date of Mar. 27, 2000 at 8:00 am.

As shown in FIG. 4, and by reference number 152, the controller 104 may modify the GPS receiver date with the offset value in a manner similar to that described with respect to FIG. 1. For example, based on the GPS receiver date of Mar. 27, 2000 and the offset value of 1,024, the controller 104 may generate a modified GPS receiver date of Nov. 11, 2019.

As shown in FIG. 4, and by reference number 154, the controller 104 may compare the modified GPS receiver date and a baseline date in a manner similar to that described with respect to FIG. 1. The controller 104 may process the modified GPS receiver date and the baseline date to determine whether the modified GPS receiver date is prior to the baseline date. For example, the controller 104 may process the modified GPS receiver date of Nov. 11, 2019 and the baseline date of Apr. 15, 2019 to determine that the modified GPS receiver date is not prior to the baseline date. Based on determining that the modified GPS receiver date is not prior to the baseline date, the controller 104 may determine that a rollover has not occurred.

Figure 5:
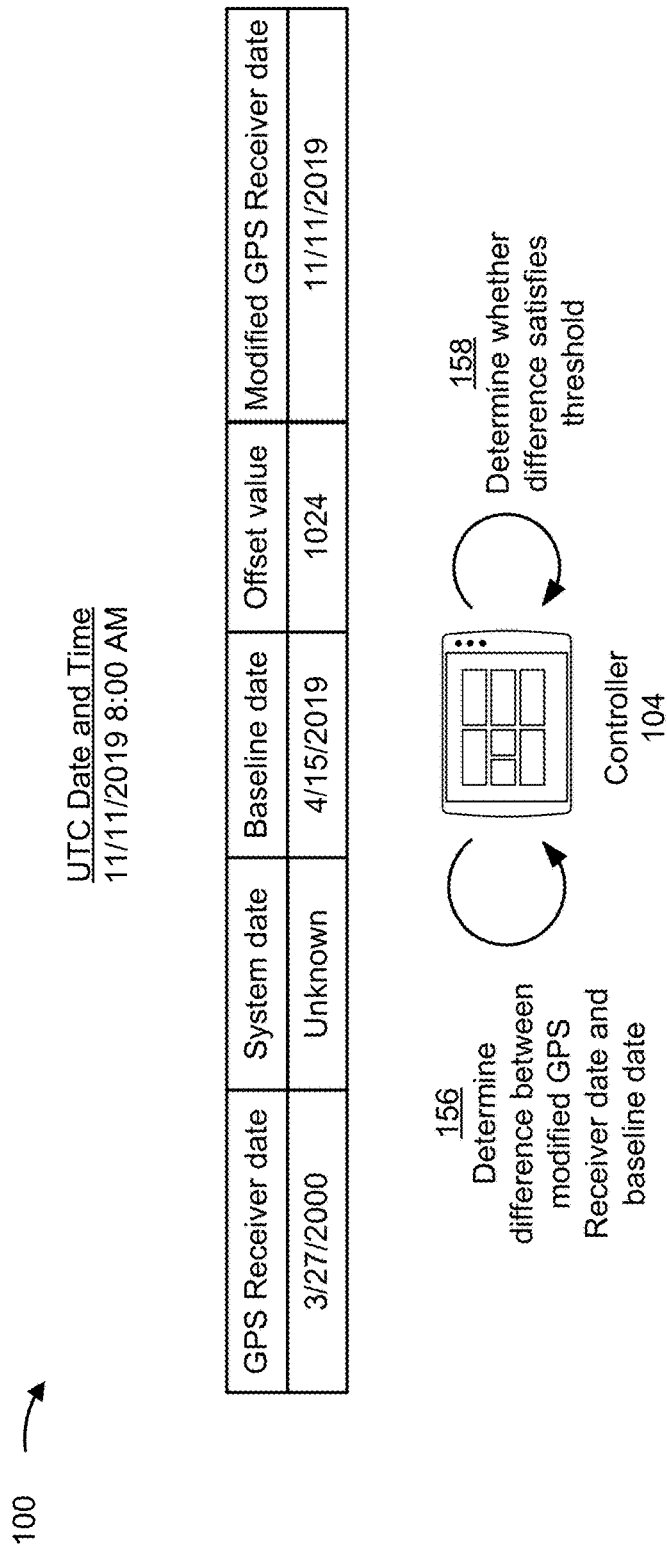
FIG. 5 is a diagram of an example implementation of time rollover detection described herein.

As shown in FIG. 5, and by reference number 156, the controller 104 may determine a difference between the modified GPS receiver date and the baseline date. For example, based on determining that the modified GPS receiver date is not prior to the baseline date, the controller 104 may determine the difference between the modified GPS receiver date and the baseline date.

As shown in FIG. 5, and by reference number 158, the controller 104 may determine whether the difference satisfies a threshold. The controller 104 may determine that the difference between the modified GPS receiver date and the baseline date satisfies the threshold based on the difference being greater than a time period (e.g., a quantity of days, weeks, months, years, and/or the like). For example, the controller 104 may determine that the difference satisfies the threshold if the difference is greater than six months. Based on the modified GPS receiver date of Nov. 11, 2019 and the baseline date of Apr. 15, 2019 shown in FIG. 5, the controller 104 may determine that the difference satisfies the threshold.

Figure 6:
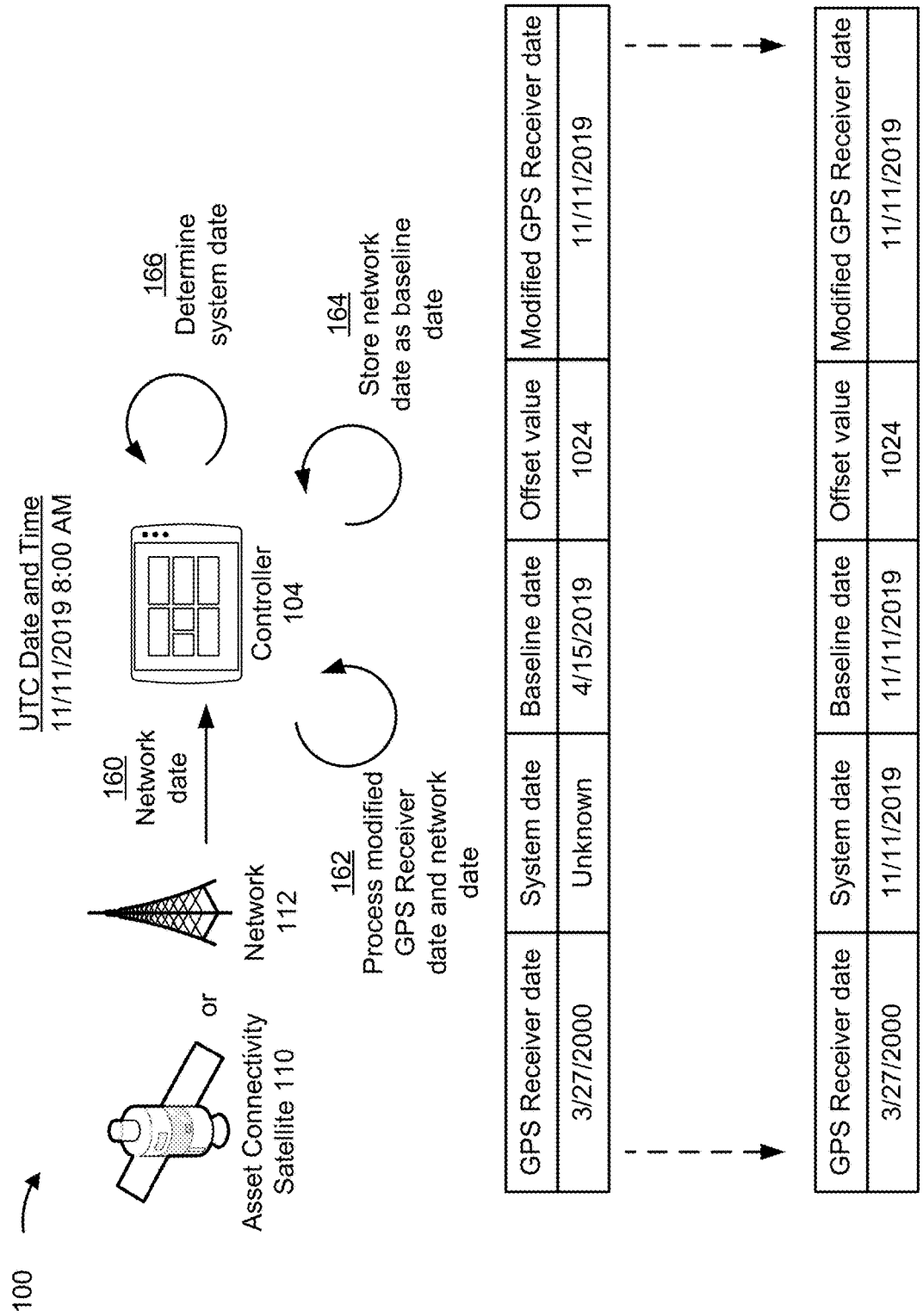
FIG. 6 is a diagram of an example implementation of time rollover detection described herein.

As shown in FIG. 6, and by reference number 160, the controller 104 may obtain, from the asset connectivity satellite 110 and/or the network 112, a network date. For example, the controller 104 may obtain, based on determining that the difference between the modified GPS receiver date and the baseline date satisfies the threshold, the network date.

As shown in FIG. 6, and by reference number 162, the controller 104 may process the modified GPS receiver date and the network date in a manner similar to that described with respect to FIG. 2. For example, the controller 104 may process the modified GPS receiver date and the network date to determine whether the modified GPS receiver date and the network date are valid.

As shown in FIG. 6, and by reference number 164, the controller 104 may store the network date as the baseline date. For example, the controller 104 may store, based on determining that the modified GPS receiver date and the network date are valid, the network date as the baseline date. As shown in FIG. 6, the network date may be Nov. 11, 2019, and the controller 104 may store the network date of Nov. 11, 2019 as the baseline date in the table.

As shown in FIG. 6, and by reference number 166, the controller 104 may determine the system date. For example, the controller 104 may determine, based on determining that the modified GPS receiver date and the network date are valid, the system date. As shown in FIG. 6, the controller 104 may determine that the system date corresponds to the network date of Nov. 11, 2019. The controller 104 may provide the system date to other components of the machine, such as the engine, the security system, the productivity-tracking system, the maintenance alert system, and/or the like in a manner similar to that described with respect to FIG. 3.

In this way, the controller 104 may determine whether the difference between the modified GPS receiver date and the baseline date satisfies the threshold, which may indicate that the baseline date should be updated, obtain the network date, update the baseline date, and provide correct system dates to components of the machine 102.

As indicated above, FIGS. 1-6 are provided as examples. Other examples may differ from what is described in connection with FIGS. 1-6.

Figure 7:
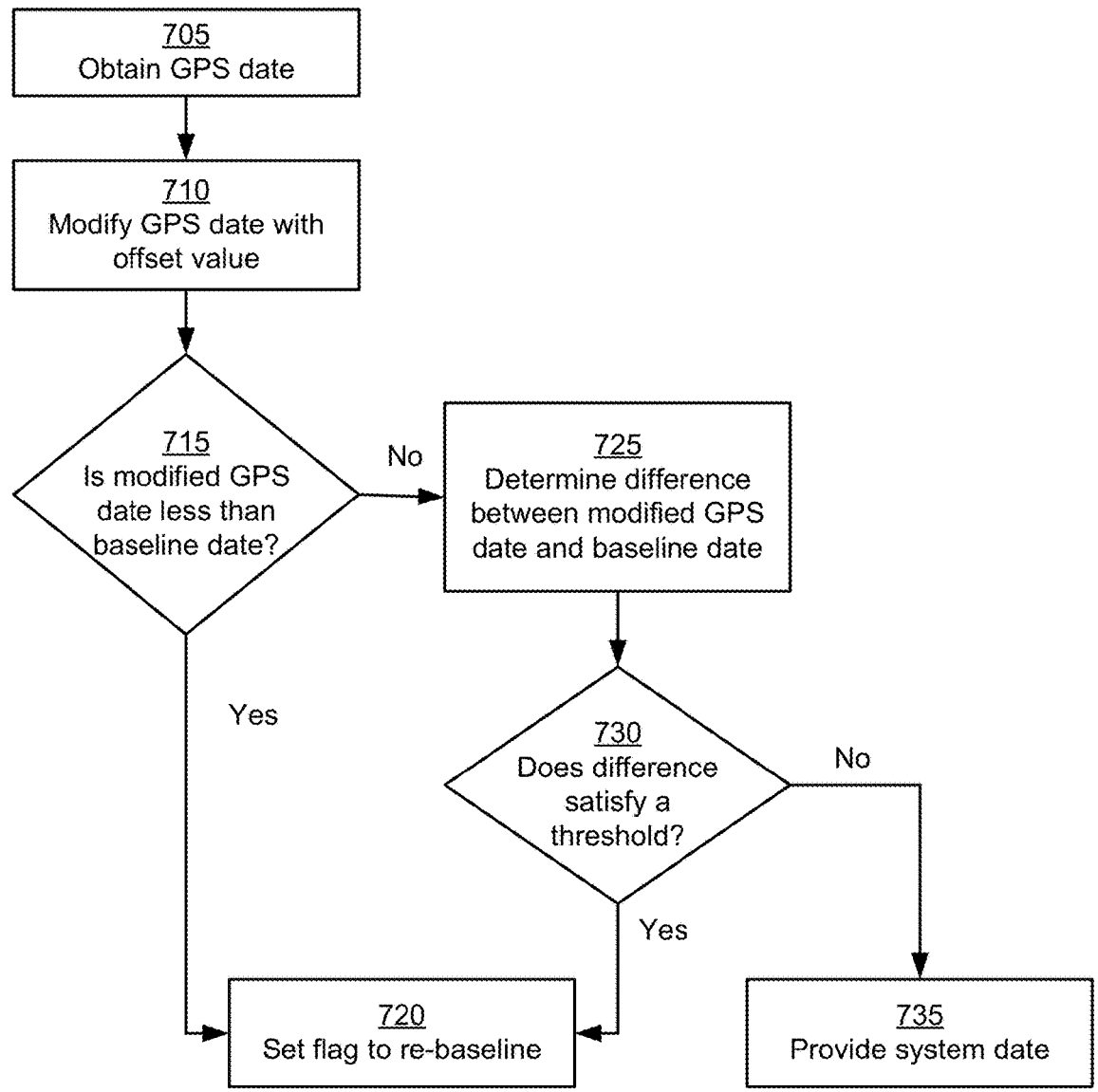
FIG. 7 is a flow chart of an example process for time rollover detection and updating a baseline date.
Figure 8:
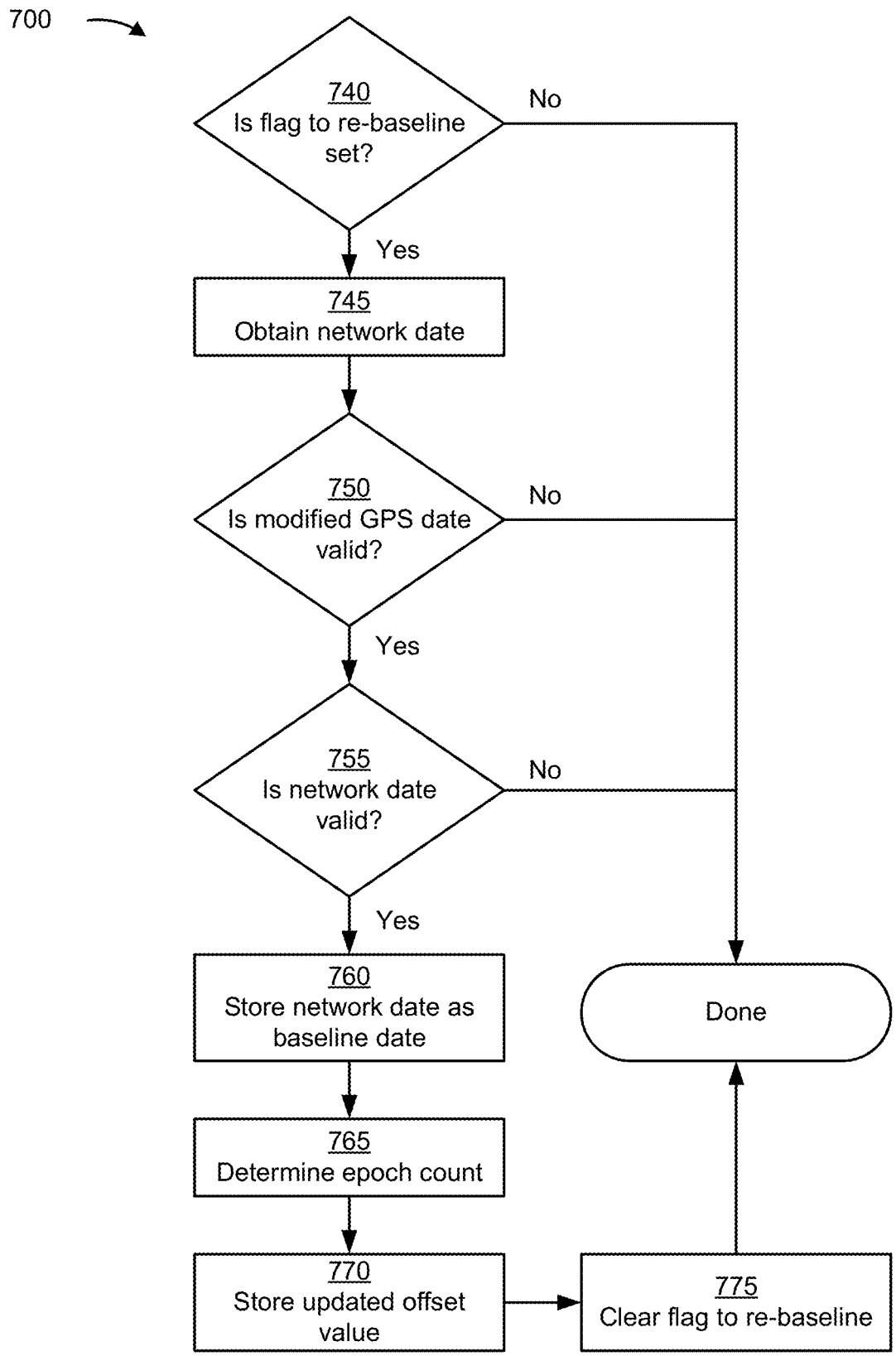
FIG. 8 is a flow chart of an example process for time rollover detection and updating a baseline date.

FIGS. 7-8 are flow charts of an example process 700 for time rollover detection and updating a baseline date. The controller 104 may perform one or more of the steps shown in the flow charts of FIGS. 7-8. For example, the controller 104 (e.g., using the GPS receiver 106) may obtain a GPS date (block 705) (e.g., in a manner similar to that described with respect to reference number 130 and/or 132 of FIG. 1, reference number 148 and/or 150 of FIG. 4, and/or the like). The controller 104 may modify the GPS date with an offset value (block 710) (e.g., in a manner similar to that described with respect to reference number 134 of FIG. 1, reference number 152 of FIG. 4, and/or the like). The controller 104 may determine whether the modified GPS date is less than a baseline date (block 715) (e.g., in a manner similar to that described with respect to reference number 136 of FIG. 1, reference number 154 of FIG. 4, and/or the like). If the modified GPS date is less than the baseline date, the controller 104 may set a flag to re-baseline (block 720) (e.g., a flag to trigger the controller 104 to perform a re-baselining method and/or the like).

If the modified GPS date is not less than the baseline date, the controller 104 may determine a difference between the modified GPS date and the baseline date (block 725) (e.g., in a manner similar to that described with respect to reference number 156 of FIG. 5 and/or the like). The controller 104 may determine whether the difference satisfies a threshold (block 730) (e.g., in a manner similar to that described with respect to reference number 158 of FIG. 5 and/or the like). If the difference satisfies the threshold, the controller 104 may set the flag to re-baseline (block 720). If the difference does not satisfy the threshold, the controller 104 may provide the system date (block 735) (e.g., to a component, a system, an application, and/or the like). For example, the controller 104 may provide the system date (block 735) in a manner similar to that described with respect to FIG. 3.

As shown in FIG. 8, the controller 104 may determine whether the flag to re-baseline is set (block 740). If the flag to re-baseline is not set, the controller 104 may stop (Done). If the flag to re-baseline is set, the controller 104 may obtain a network date (block 745) (e.g., in a manner similar to that described with respect to reference number 138 of FIG. 2, reference number 160 of FIG. 6, and/or the like).

The controller 104 may determine whether the modified GPS date is valid (block 750) (e.g., in a manner similar to that described with respect to reference number 140 of FIG. 2, reference number 162 of FIG. 6, and/or the like). If the modified GPS date is not valid, the controller 104 may stop (Done). If the modified GPS date is valid, the controller may determine whether the network date is valid (block 755) (e.g., in a manner similar to that described with respect to reference number 140 of FIG. 2, reference number 162 of FIG. 6, and/or the like). If the network date is not valid, the controller 104 may stop (Done).

If the network date is valid, the controller 104 may store the network date as the baseline date (block 760) (e.g., in a manner similar to that described with respect to reference number 142 of FIG. 2, reference number 164 of FIG. 6, and/or the like). The controller 104 may determine an epoch count (block 765) (e.g., based on the network date, a system date, a beginning date, and/or the like). For example, the controller 104 may determine the epoch count (block 765) in a manner similar to that described with respect to FIG. 3. The controller 104 may store an updated offset value (block 770) (e.g., based on the epoch count and/or the like). For example, the controller 104 may store the updated offset value (block 770) in a manner similar to that described with respect to reference number 144 of FIG. 3. After storing the network date as the baseline date, determining the epoch count, and/or storing the updated offset value, the controller 104 may clear the flag to re-baseline (block 775).

As indicated above, FIGS. 7-8 are provided as examples. Other examples may differ from what is described in connection with FIGS. 7-8.

Figure 9:
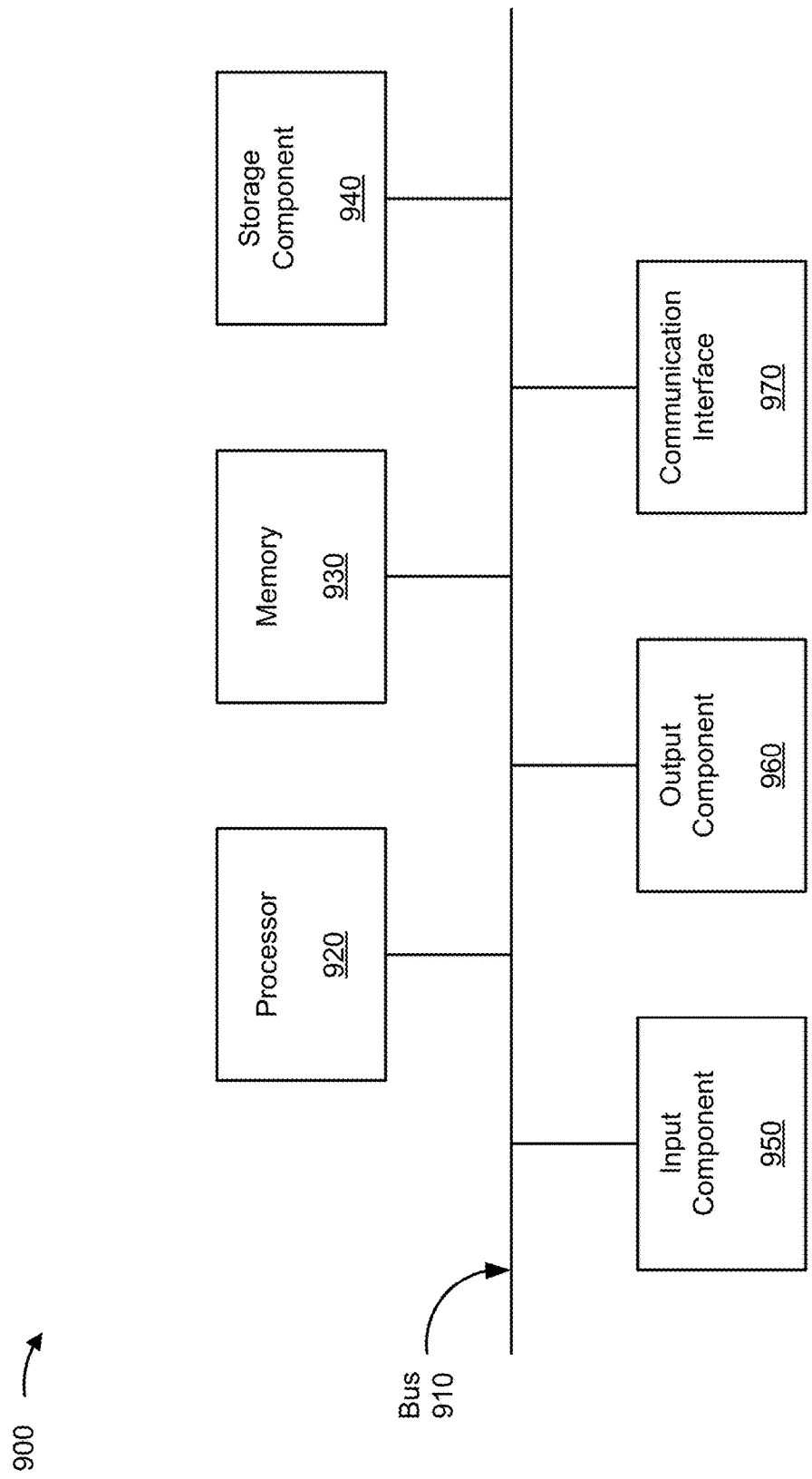
FIG. 9 is a diagram of example components of one or more devices of FIGS. 1-6.

FIG. 9 is a diagram of example components of a device 900. Device 900 may correspond to the controller 104 and/or the GPS receiver 106. The controller 104 and/or the GPS receiver 106 may include one or more devices 900 and/or one or more components of device 900. As shown in FIG. 9, device 900 may include a bus 910, a processor 920, a memory 930, a storage component 940, an input component 950, an output component 960, and a communication interface 970.

Bus 910 includes a component that permits communication among multiple components of device 900. Processor 920 is implemented in hardware, firmware, and/or a combination of hardware and software. Processor 920 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. Processor 920 may include one or more processors capable of being programmed to perform a function. Memory 930 includes a random access memory (RAM), a read only memory (ROM), and/or another type of dynamic or static storage device (e.g., a flash memory, a magnetic memory, and/or an optical memory) that stores information and/or instructions for use by processor 920.

Storage component 940 stores information and/or software related to the operation and use of device 900. For example, storage component 940 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 950 includes a component that permits device 900 to receive information, such as via user input (e.g., a touch screen display, a keyboard, a keypad, a mouse, a button, a switch, and/or a microphone). Additionally, or alternatively, input component 950 may include a component for determining location (e.g., a global positioning system (GPS) component) and/or a sensor (e.g., an accelerometer, a gyroscope, an actuator, another type of positional or environmental sensor, and/or the like). Output component 960 includes a component that provides output information from device 900 (via, e.g., a display, a speaker, a haptic feedback component, an audio or visual indicator, and/or the like).

Communication interface 970 includes a transceiver-like component (e.g., a transceiver, a separate receiver, a separate transmitter, and/or the like) that enables device 900 to communicate with other devices, such as via a wired connection, a wireless connection, or a combination of wired and wireless connections. Communication interface 970 may permit device 900 to receive information from another device and/or provide information to another device. For example, communication interface 970 may include an Ethernet interface, an optical interface, a coaxial interface, an infrared interface, a radio frequency (RF) interface, a universal serial bus (USB) interface, a wireless local area network interface, a cellular network interface, and/or the like.

Device 900 may perform one or more processes described herein. Device 900 may perform these processes based on processor 920 executing software instructions stored by a non-transitory computer-readable medium, such as memory 930 and/or storage component 940. As used herein, the term "computer-readable medium" refers to a non-transitory memory device. A memory device includes memory space within a single physical storage device or memory space spread across multiple physical storage devices.

Software instructions may be read into memory 930 and/or storage component 940 from another computer-readable medium or from another device via communication interface 970. When executed, software instructions stored in memory 930 and/or storage component 940 may cause processor 920 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 9 are provided as an example. In practice, device 900 may include additional components, fewer components, different components, or differently arranged components than those shown in FIG. 9. Additionally, or alternatively, a set of components (e.g., one or more components) of device 900 may perform one or more functions described as being performed by another set of components of device 900.

Figure 10:
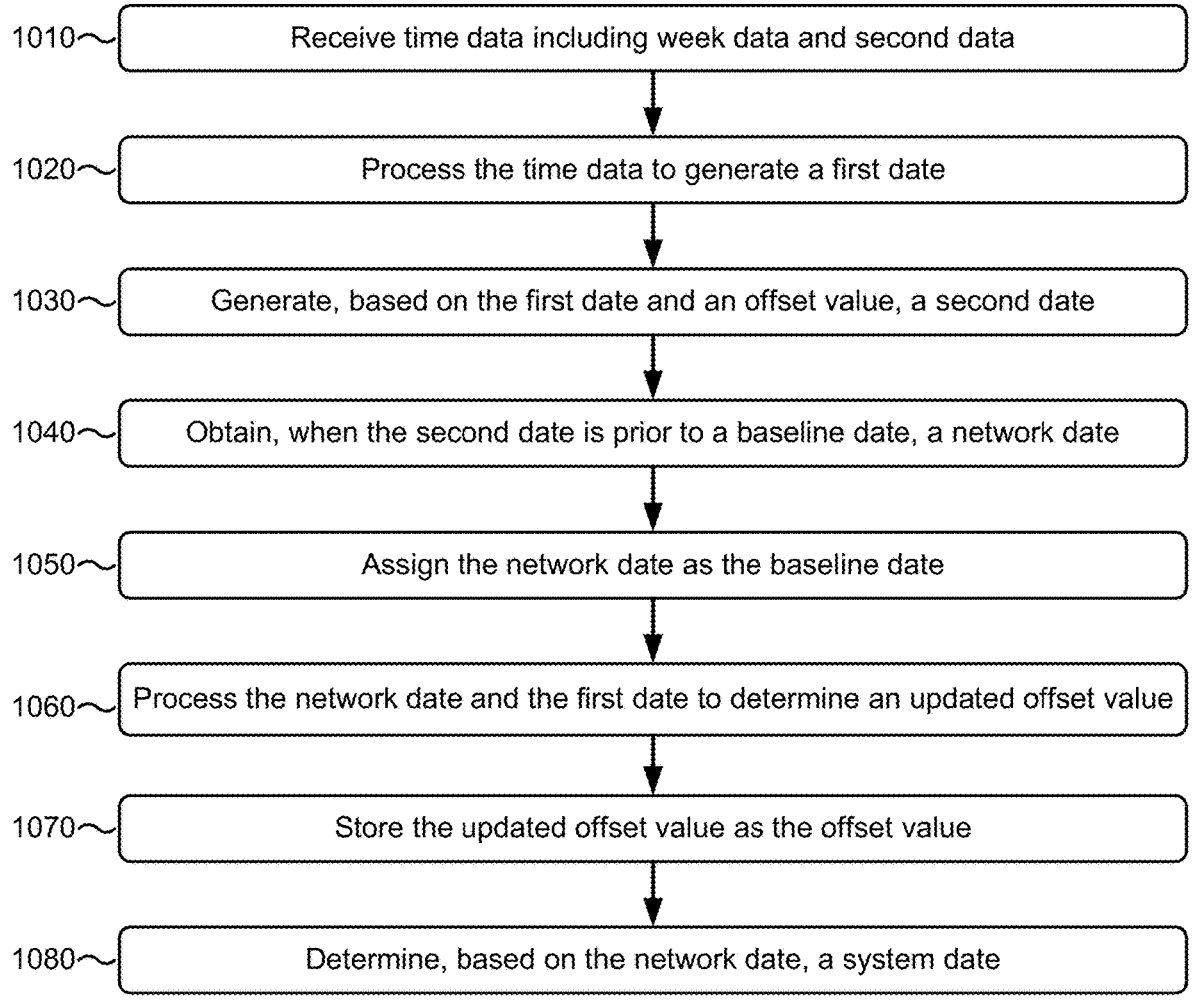
FIG. 10 is a flow chart of an example process for time rollover detection.

FIG. 10 is a flow chart of an example process 1000 for time rollover detection. One or more process blocks of FIG. 10 may be performed by a controller (e.g., controller 104). One or more process blocks of FIG. 10 may be performed by another device or a group of devices separate from or including the controller, such as a GPS receiver (e.g., GPS receiver 106), and/or the like.

As shown in FIG. 10, process 1000 may include receiving time data including week data and second data (block 1010). For example, the controller (e.g., using processor 920, memory 930, storage component 940, input component 950, output component 960, communication interface 970, and/or the like) may receive time data including week data and second data, as described above. The controller may be a controller for a machine, and the machine may include at least one of a dozer, an excavator, a haul truck, a paver, or a compactor. Receiving the time data may include receiving the time date from a GNSS satellite.

As further shown in FIG. 10, process 1000 may include processing the time data to generate a first date (block 1020). For example, the controller (e.g., using processor 920, memory 930, storage component 940, input component 950, output component 960, communication interface 970, and/or the like) may process the time data to generate a first date, as described above.

As further shown in FIG. 10, process 1000 may include generating, based on the first date and an offset value, a second date (block 1030). For example, the controller (e.g., using processor 920, memory 930, storage component 940, input component 950, output component 960, communication interface 970, and/or the like) may generate, based on the first date and an offset value, a second date, as described above.

As further shown in FIG. 10, process 1000 may include obtaining, when the second date is prior to a baseline date, a network date (block 1040). For example, the controller (e.g., using processor 920, memory 930, storage component 940, input component 950, output component 960, communication interface 970, and/or the like) may obtain, when the second date is prior to a baseline date, a network date, as described above. Obtaining the network date may include obtaining the network date from at least one of a network time protocol or a satellite system.

As further shown in FIG. 10, process 1000 may include assigning the network date as the baseline date (block 1050). For example, the controller (e.g., using processor 920, memory 930, storage component 940, input component 950, output component 960, communication interface 970, and/or the like) may assign the network date as the baseline date, as described above.

As further shown in FIG. 10, process 1000 may include processing the network date and the first date to determine an updated offset value (block 1060). For example, the controller (e.g., using processor 920, memory 930, storage component 940, input component 950, output component 960, communication interface 970, and/or the like) may process the network date and the first date to determine an updated offset value, as described above. Processing the network date and the first date to determine the updated offset value may include determining a difference between the first date and the network date and dividing the difference between the first date and the network date by an integer.

As further shown in FIG. 10, process 1000 may include storing the updated offset value as the offset value (block 1070). For example, the controller (e.g., using processor 920, memory 930, storage component 940, input component 950, output component 960, communication interface 970, and/or the like) may store the updated offset value as the offset value, as described above.

As further shown in FIG. 10, process 1000 may include determining, based on the network date, a system date (block 1080). For example, the controller (e.g., using processor 920, memory 930, storage component 940, input component 950, output component 960, communication interface 970, and/or the like) may determine, based on the network date, a system date, as described above. Determining the system date may include determining that the system date corresponds to the network date.

Process 1000 may include providing, when the second date is prior to the baseline date and to an application, the system date. Process 1000 may include providing, when the second date is prior to the baseline date and to an application, a system date based on the network date, wherein the application determines, based on the system date, whether to cause a door of the machine to be locked.

Process 1000 may include providing, when the second date is not prior to the baseline date, and to an application, a system date, wherein the system date corresponds to the second date. Process 1000 may include processing, when the second date is not prior to the baseline date, the second date and the baseline date to determine that a difference between the second date and the baseline date satisfies a threshold or that the difference between the second date and the baseline date does not satisfy the threshold, obtaining, based on the difference between the second date and the baseline date satisfying the threshold, the network date, and storing the network date as the baseline date.

Process 1000 may include determining, based on a difference between the network date and the first date, an epoch count, and storing the epoch count. Process 1000 may include periodically processing received time data to generate another date, generating, based on the offset value and the other date, a modified date, obtaining another network date, and processing the other network date and the modified date to determine that the modified date corresponds to the other network date or that the modified date does not correspond to the other network date.

Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

INDUSTRIAL APPLICABILITY

The controller 104 of the machine 102 may be configured to provide instructions and/or information to components of the machine, such as an engine, a security system, a productivity-tracking system, a maintenance alert system, and/or the like. For example, the controller 104 may be configured to provide a system date and/or time to the components of the machine 102 when an operator turns on the machine 102, the controller 104, and/or the like. The components of the machine may use the system date to perform functions, such as enabling the engine to start, locking and unlocking doors on the machine 102, providing information regarding operation of the machine 102 by the operator to an employee management system, providing maintenance information to the operator and/or a maintenance management system, and/or the like.

Because the machine 102 may not be used for long periods of time (e.g., days, weeks, months, years, and/or the like), the machine 102 may not include a power source (e.g., a battery and/or the like) to power a clock in the controller 104, and the system date may be unknown to the controller 104 when turned on. The controller 104 may obtain, using the GPS receiver 106 and from the GPS satellite 108, time data. The GPS receiver 106 may provide, to the controller 104 and based on the time data, a GPS receiver date, and the controller 104 may determine the system date based on the GPS receiver date.

Due to GPS rollovers, however, the controller 104 may determine, based on the GPS receiver date, an incorrect system date. The controller 104 may provide the incorrect system date to the components of the machine, and the components may not function properly (e.g., the engine may not start, the doors may be locked and/or unlocked at incorrect times and/or on incorrect days, maintenance alerts may not be generated, and/or the like).

Accordingly, the controller 104 may detect a GPS rollover based on the baseline date. The controller 104 may obtain, based on detecting a GPS rollover and from the asset connectivity satellite 110 or the network 112, a network date to confirm that a GPS rollover has occurred. By obtaining the network date after determining that the rollover has occurred, the controller 104 may conserve computing resources (e.g., processing resources, memory resources, power resources, communication resources, and/or the like) and/or network resources that would otherwise be consumed by obtaining the network date each time the machine 102, the controller 104, and/or the like is turned on.

The controller 104 may update, based on the network date, the baseline date and an offset value (e.g., stored in nonvolatile memory). The controller 104 may modify the GPS receiver date based on the offset value to determine correct system dates in the future. By using the offset value to modify the GPS receiver date, the controller 104 may conserve computing resources (e.g., processing resources, memory resources, power resources, communication resources, and/or the like) and/or network resources that would otherwise be consumed by obtaining the network date each time the machine 102, the controller 104, and/or the like is turned on.

Before determining the system date, updating the baseline date, updating the offset value, and/or the like, the controller 104 may determine whether the GPS receiver date and the network date are valid. By determining whether the GPS receiver date and the network date are valid before determining the system date, updating the baseline date, updating the offset value, and/or the like, the controller 104 may prevent invalid GPS receiver dates and/or network dates from impacting the system date, the baseline date, the offset value, and/or the like.

The controller 104 may determine a difference between the baseline date and the GPS receiver date modified with the offset value, and may determine whether the difference satisfies a threshold. The controller 104 may obtain, based on determining that the difference satisfies the threshold, a network date, and may, based on the network date, update the baseline date. In this way, the controller 104 may periodically update the baseline date to improve GPS rollover detection and the accuracy of determined system dates. By obtaining the network date after determining that the baseline date satisfies the threshold and should be updated, the controller 104 may conserve computing resources (e.g., processing resources, memory resources, power resources, communication resources, and/or the like) and/or network resources that would otherwise be consumed by obtaining the network date each time the machine 102, the controller 104, and/or the like is turned on. In this way, the controller 104 may provide correct time and/or date information to other components, systems, applications, and/or the like.

The term "machine" may refer to any machine that performs an operation associated with an industry such as, for example, mining, construction, farming, transportation, or any other industry. As some examples, the machine may be a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, a train, a locomotive, a railcar, a rail vehicle, a generator set, or other above ground equipment, underground equipment, or marine equipment. Moreover, one or more implements may be connected to the machine and driven from the controller.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. A method, comprising:
   receiving, by a controller for a machine, time data including week data and second data;
   processing, by the controller, the time data to generate a first date;
   generating, by the controller and based on the first date and an offset value, a second date;
   obtaining, by the controller and when the second date is prior to a baseline date, a network date;
   assigning, by the controller, the network date as the baseline date;

processing, by the controller, the network date and the first date to determine an updated offset value;
storing, by the controller, the updated offset value as the offset value;
providing, by the controller, when the second date is prior to the baseline date, and to an application, a system date based on the network date,
   wherein the application determines, based on the system date, whether to cause a door of the machine to be locked; and
providing, by the controller, when the second date is not prior to the baseline date, and to the application, the system date,
   wherein the system date corresponds to the second date.

2. The method of claim 1, wherein receiving the time data comprises receiving the time data from a Global Navigation Satellite System (GNSS) satellite.

3. The method of claim 1, wherein obtaining the network date comprises:
obtaining the network date from at least one of a network time protocol or a satellite system.

4. The method of claim 1, further comprising:
processing, when the second date is not prior to the baseline date, the second date and the baseline date to determine that a difference between the second date and the baseline date satisfies a threshold or that the difference between the second date and the baseline date does not satisfy the threshold; and
obtaining, based on the difference between the second date and the baseline date satisfying the threshold, the network date; and
storing the network date as the baseline date.

5. The method of claim 1, wherein the machine comprises at least one of a dozer, an excavator, a haul truck, a paver, or a compactor.

6. A method, comprising:
receiving, by a device, time data including week data and second data;
processing, by the device, the time data to generate a first date;
generating, by the device and based on the first date and an offset value, a second date;
obtaining, by the device and when the second date is prior to a baseline date, a network date;
assigning, by the device, the network date as the baseline date;
processing, by the device, the network date and the first date to determine an updated offset value;
storing, by the device, the updated offset value as the offset value; and
determining, by the device and based on the network date, a system date.

7. The method of claim 6, wherein processing the network date and the first date to determine the updated offset value comprises:
determining a difference between the first date and the network date; and
dividing the difference between the first date and the network date by an integer.

8. The method of claim 6, wherein determining the system date comprises:
determining that the system date corresponds to the network date.

9. The method of claim 6, further comprising:
providing, when the second date is prior to the baseline date and to an application, the system date.

10. The method of claim 6, further comprising:
providing, when the second date is not prior to the baseline date and to an application, the system date, wherein the system date corresponds to the second date.

11. The method of claim 6, further comprising:
processing, when the second date is not prior to the baseline date, the second date and the baseline date to determine that a difference between the second date and the baseline date satisfies a threshold or that the difference between the second date and the baseline date does not satisfy the threshold;
obtaining, based on the difference between the second date and the baseline date satisfying the threshold, the network date; and
storing the network date as the baseline date.

12. The method of claim 6, further comprising:
determining, based on a difference between the network date and the first date, an epoch count; and
storing the epoch count.

13. The method of claim 6, further comprising:
periodically processing received time data to generate another date;
generating, based on the offset value and the other date, a modified date;
obtaining another network date; and
processing the other network date and the modified date to determine that the modified date corresponds to the other network date or that the modified date does not correspond to the other network date.

14. A method, comprising:
receiving, by a device and from a Global Navigation Satellite System (GNSS) satellite, time data including week data and second data;
processing, by the device, the time data to generate a first date;
generating, by the device and based on the first date and an offset value, a second date;
obtaining, by the device and when the second date is prior to a baseline date, a network date from at least one of a network time protocol or a satellite system;
assigning, by the device, the network date as the baseline date;
processing, by the device, the network date and the first date to determine an updated offset value;
storing, by the device, the updated offset value as the offset value; and
determining, by the device and based on the network date, a system date.

15. The method of claim 14, wherein processing the network date and the first date to determine the updated offset value comprises:
determining a difference between the first date and the network date; and
dividing the difference between the first date and the network date by an integer.

16. The method of claim 14, wherein determining the system date comprises:
determining that the system date corresponds to the network date.

17. The method of claim 14, further comprising:
providing, when the second date is prior to the baseline date and to an application, the system date.

18. The method of claim 14, further comprising:
providing, when the second date is not prior to the baseline date and to an application, the system date, wherein the system date corresponds to the second date.

19. The method of claim 14, further comprising:

processing, when the second date is not prior to the baseline date, the second date and the baseline date to determine that a difference between the second date and the baseline date satisfies a threshold or that the difference between the second date and the baseline date does not satisfy the threshold; and obtaining, based on the difference between the second date and the baseline date satisfying the threshold, the network date; and storing the network date as the baseline date.

20. The method of claim 14, further comprising:

periodically processing received time data to generate another date;

generating, based on the offset value and the other date, a modified date;

obtaining another network date; and processing the other network date and the modified date to determine that the modified date corresponds to the other network date or that the modified date does not correspond to the other network date.

\* \* \* \* \*